(12) United States Patent
Tsujimoto

(10) Patent No.: US 6,961,096 B1
(45) Date of Patent: Nov. 1, 2005

(54) APPARATUS FOR AND METHOD OF CONVERTING LOCATION INFORMATION, AND COMPUTER PROGRAM PRODUCT THAT IS USED THEREFOR

(75) Inventor: Shinichi Tsujimoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,174

(22) Filed: Dec. 20, 1999

(30) Foreign Application Priority Data

Dec. 25, 1998 (JP) .................................. 10/370531

(51) Int. Cl.⁷ ............................................ H04N 11/00
(52) U.S. Cl. .............. 348/552; 348/207.11; 348/231.3; 386/46; 386/83; 386/95
(58) Field of Search .................. 386/38, 40, 83, 386/95, 46; 348/96, 162, 207.1, 333.02, 552, 348/725, 207.11, 231.3

(56) References Cited

U.S. PATENT DOCUMENTS 5,023,635 A * 6/1991 Nealon ........................ 396/311
5,296,884 A * 3/1994 Honda et al. ................ 396/311
5,335,072 A * 8/1994 Tanaka et al. ............. 348/231.3
5,477,264 A * 12/1995 Sarbadhikari et al. .... 348/231.6
5,633,678 A * 5/1997 Parulski et al. ........... 348/231.5
5,682,458 A * 10/1997 Funazaki ..................... 386/128
6,469,698 B2 * 10/2002 Fukahori ...................... 345/204
6,507,371 B1 * 1/2003 Hashimoto et al. ......... 348/552
6,812,962 B1 * 11/2004 Fredlund et al. ......... 348/231.2

FOREIGN PATENT DOCUMENTS

| JP | 4-70735 | 3/1992 |
| JP | 6-110117 | 4/1994 |
| JP | 8-36217 | 2/1996 |

\* cited by examiner

*Primary Examiner*—Andrew Faile
*Assistant Examiner*—James A. Fletcher
(74) *Attorney, Agent, or Firm*—Fitzpatrick, Cella, Harper & Scinto

(57) ABSTRACT

An apparatus for, a method of, and a computer program product for processing location information associated with an image of picture-taking, in a wide range of usage, inputs the location information associated with the image of picture-taking, and converts the input location information to a plurality of signals in different representation forms.

36 Claims, 15 Drawing Sheets

FIG. 3

| <ORIGINAL INFORMATION> LATITUDE  LONGITUDE | <CHARACTER INFORMATION> PLACE NAME · LOCATION NAME | <CODE INFORMATION> CODE NUMBER |
|---|---|---|
| N 035° 33' 48"   E 139° 41' 06" | Shimomaruko 3-chome Ohta-ku Tokyo Japan | 0081-0003-0012-0043 |
| N 035° 34' 06"   E 139° 41' 03" | Shimomaruko 4-chome Ohta-ku Tokyo Japan | 0081-0003-0012-0044 |

CONVERSION TABLE

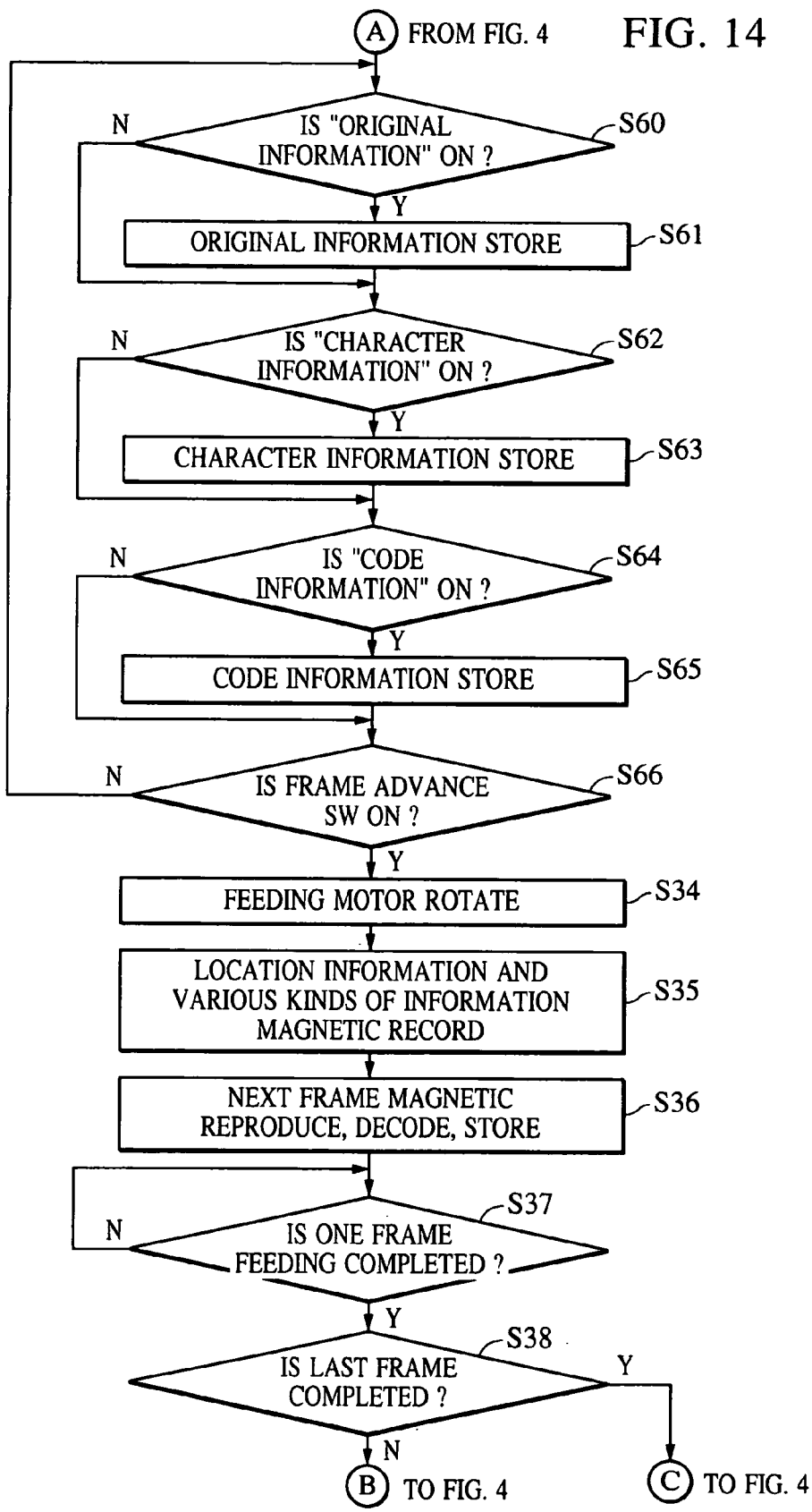

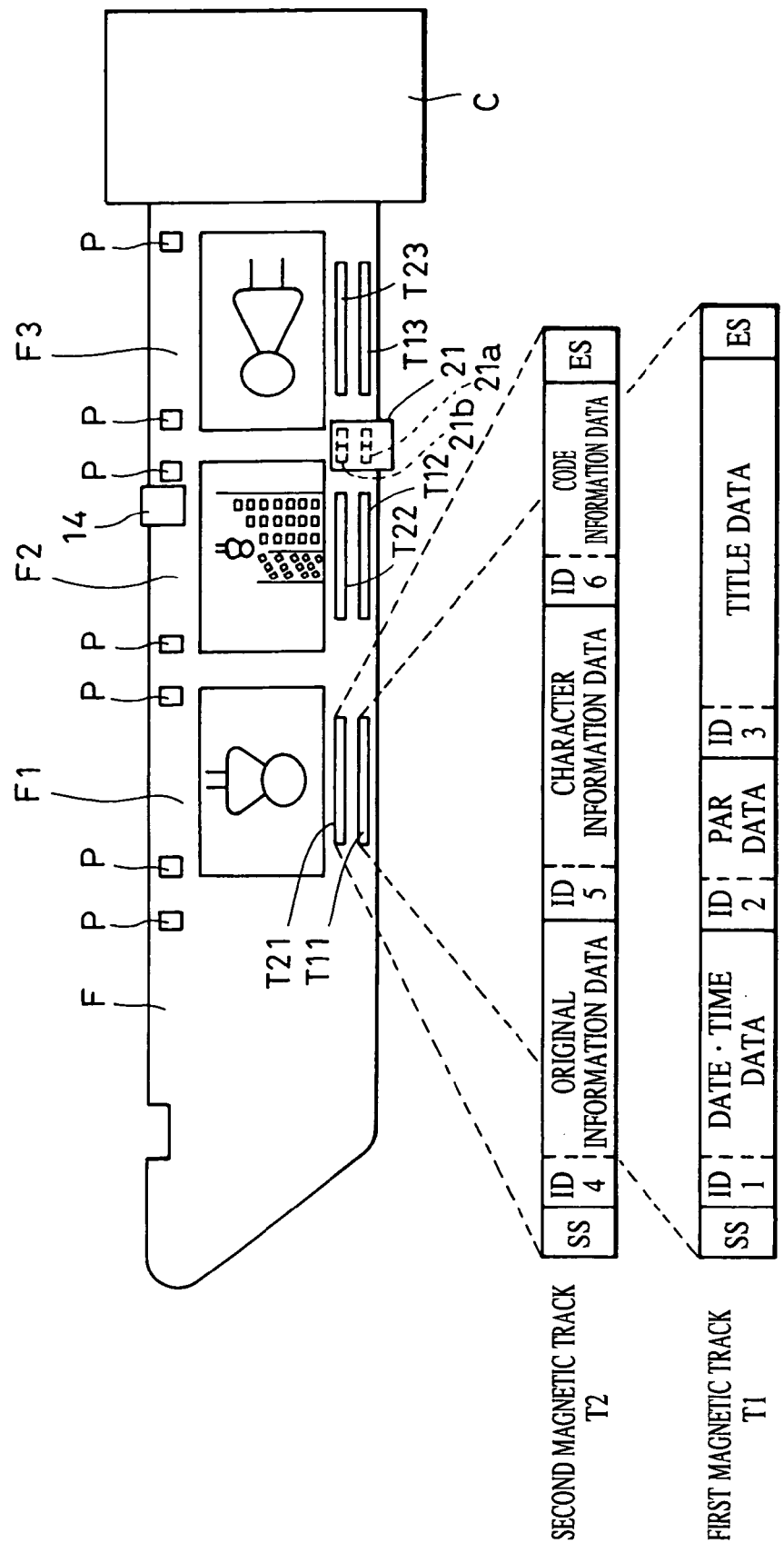

APPARATUS FOR AND METHOD OF CONVERTING LOCATION INFORMATION, AND COMPUTER PROGRAM PRODUCT THAT IS USED THEREFOR

BACKGROUND OF THE INVENTION

1. Field of the Invention

The present invention relates to an apparatus for and a method of converting location information, which is suitable for use in recording an image picked up by a camera and information indicating a pickup location thereof into a recording medium, and to a computer program product that is used therefor, such as a computer readable storage medium.

2. Description of the Related Art

It is useful to record information regarding the locations where the images are taken (including location information such as latitude and longitude, a place name, such as an address, a name of a building, a location name, such as a sightseeing place, and the like), together with the images taken by a camera, when appreciating the images in various ways thereafter, and thus there are proposed various ideas for recording information regarding the locations at a time when taking the images.

For example, in Japanese Patent Laid-Open No. 6-110117, there is disclosed the invention in which a database for location information and selection means for selecting from the database location information with which an image is recorded, are provided in a camera, and desired location information is selected and operated by a photographer at a time of picture-taking, so as to record the location information on a photo film together with the image. Herein the location information is a so-called place name, and it is recorded on the photo film as character information.

Further, in Japanese Patent Laid-Open No. 4-70735, there is disclosed a camera in which two detecting means, such as detecting means in a positioning system by GPS (Global Positioning System), and detecting means of information from a system that provides location information that is characterized in a specific location or a region in an FM wave, are provided with the camera, and either one of the detected results of the two detecting means is recorded in a memory card along with an image taken in accordance with a predetermined order of priority.

Moreover, in Japanese Patent Laid-Open No. 8-36217, there is disclosed detecting means of a positioning system by GPS to a camera, and a camera for recording detected location information along with an image on a photo film by encoding the detected location information, and an apparatus for printing converted information on a photographic print, or for displaying it on a TV monitor, as reproducing location information that is encoded from the photo film after having been taken, and then converting it to information which is understandable by human beings, such as a place name, and the like by collating it with a database.

Information for a location associated with an image (hereinafter, it is referred to as location information) could be utilized in a variety of ways in accordance with an appreciation aspect of an image. For example, it is considered that a picture-taking location may be clarified by printing it with an image on a photographic print, or by displaying it with an image on a TV or a CRT monitor. In this case, it is preferable that, as the information for the location, the place name, the location name and the like are displayed as character information.

In academic usage and the like, it is preferable that the latitude and longitude information based on the detected results of the positioning means using the GPS are recorded as they are, and are displayed along with the image.

Further, in a usage that facilitates image retrieval for each of the picture-taking locations by constructing an image database within a computer, it is convenient to provide a code list in which predetermined codes are provided for each of the locations, and to record the location information with these codes. This is because it is possible to make a memory capacity for recording or for storing to be relatively small with the codes, and it is possible to construct a system having a compatibility among the various kinds of application software, by unifying the code lists.

Also, obviously, it is preferable that the location information can be obtained and recorded easily, without performing an extra operation at a time when picture-taking.

In the above-mentioned Japanese Patent Laid-Open No. 6-110117, it is inconvenient to do the operation of selecting the desired location information from the database for the location information at a time of picture-taking, and also the database for the location information is required to have a very large memory capacity considering one camera is to be used all over the world, and thus it has a disadvantage as to not be practical to install it in a camera. Also, it has a disadvantage as to enable one to manipulate only the character information for the place name or the location name, and thus it is not suitable for a wide range of usage.

Further, in the above-mentioned Japanese Patent Laid-Open No. 4-70735, information for a location is recorded automatically at a time of a picture-taking, but the information to be recorded along with the image is only one kind that is determined by a predetermined order of priority, and thus it has a disadvantage as to be not suitable for a wide range of usage.

Moreover, in the above-mentioned Japanese Patent Laid-Open No. 8-36217, encoded location information that is recorded automatically by a camera is converted by a second apparatus having a database of location information to information which is understandable by a human being, and then is displayed and printed along with an image, but it enables one to manipulate only character information, such as a place name, a location name and the like, and as a result it has a disadvantage as not enabling one to deal with a wide range of usage. Further, the location information recorded on a photo film along with an image is only encoded information, and thus it has a disadvantage of not enabling one to transmit character information, such as the place name, the location name and the like, that are obtained from the database to a third apparatus, and of not enabling one to reuse them.

SUMMARY OF THE INVENTION

Accordingly, it is an object of the present invention to provide an apparatus for enabling one to deal with location information associated with an image of picture-taking, to a wide range of usage, by inputting the location information associated with the image of picture-taking, and by converting the input location information to a plurality of signals in different representation forms.

It is another object of the present invention to provide a method for processing location information associated with an image of picture-taking, in a wide range of usage, by inputting the location information associated with the image of picture-taking, and by converting the input location information to a plurality of signals in different representation forms.

It is yet another object of the present invention to provide a computer program product which is able to process location information associated with an image of picture-taking, in a wide range of usage, by inputting the location information associated with the image of picture-taking, and by converting the input location information to a plurality of signals in different representation forms.

It is an another object of the present invention to provide an apparatus that processes location information associated with an image of picture-taking, in a wide range of usage, by inputting, as original information, the location information associated with the image of picture-taking from an image recording medium into which the images of picture-taking are recorded, by converting the input original information to location information in a predetermined representation form, and by recording the converted location information in the predetermined representation form into the image recording medium.

It is another object of the present invention to provide a method for processing location information associated with an image of picture-taking, in a wide range of usage, by inputting, as original information, the location information associated with the image of picture-taking from an image recording medium into which the images of picture-taking are recorded, by converting the input original information to the location information in a predetermined representation form, and by recording the converted location information in the predetermined representation form into the image recording medium.

It is yet another object of the present invention to provide a computer program product which is able to process location information associated with an image of picture-taking, in a wide range of usage, by inputting, as original information, the location information associated with the image of picture-taking from an image recording medium into which the images of picture-taking are recorded, by converting the input original information to location information in a predetermined representation form, and by recording the converted location information in the predetermined representation form into the image recording medium.

Further objects and advantages of the invention can be more fully understood from the following detailed description taken in conjunction with the accompanying drawings.

BRIEF DESCRIPTION OF THE DRAWINGS

FIG. 3 is a configuration diagram showing the contents of a conversion table;

FIG. 14 is a flowchart showing an operation of the third embodiment; and

FIG. 15 is a configuration diagram for illustrating a recording operation of the third embodiment.

DESCRIPTION OF THE PREFERRED EMBODIMENTS

In the following, the preferred embodiments of the present invention will be described in more detail with reference to the drawings.

Initially, a first embodiment of the present invention will be described.

Figure 8:
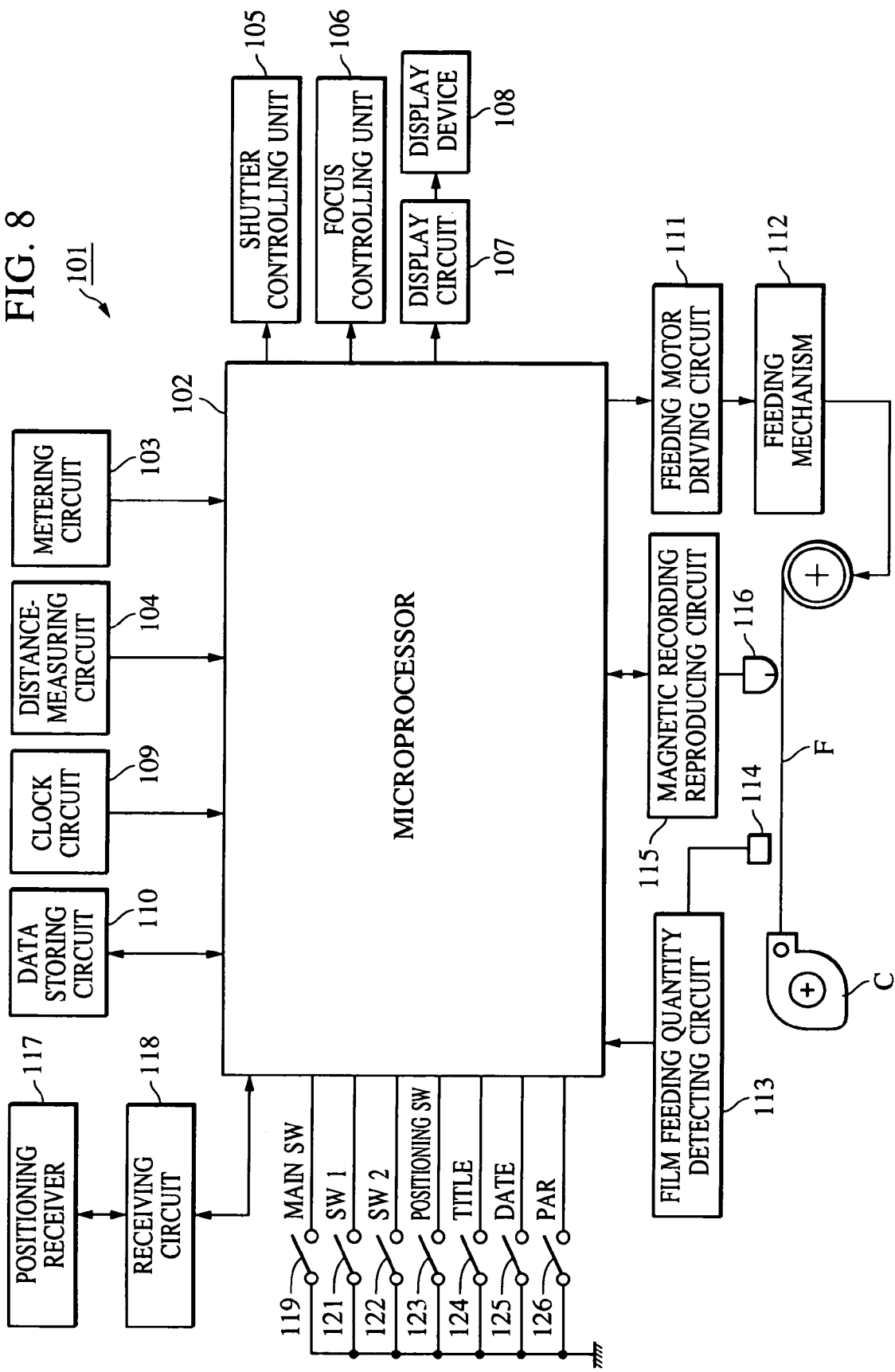
FIG. 8 is a block diagram showing a configuration of a camera according to the first embodiment.
Figure 10:
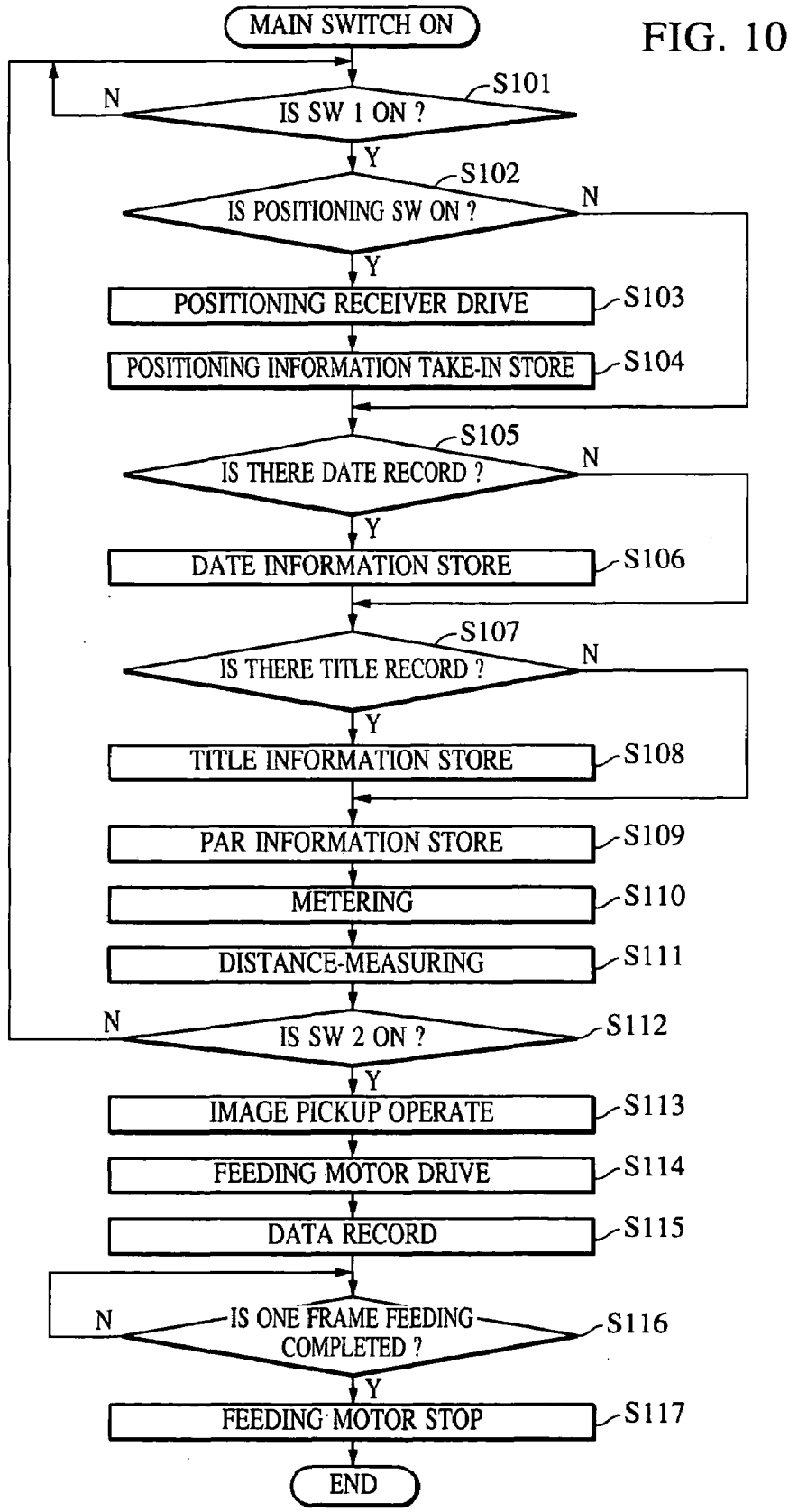
FIG. 10 is a flowchart showing an operation of the camera according to the first embodiment.
Figure 11:
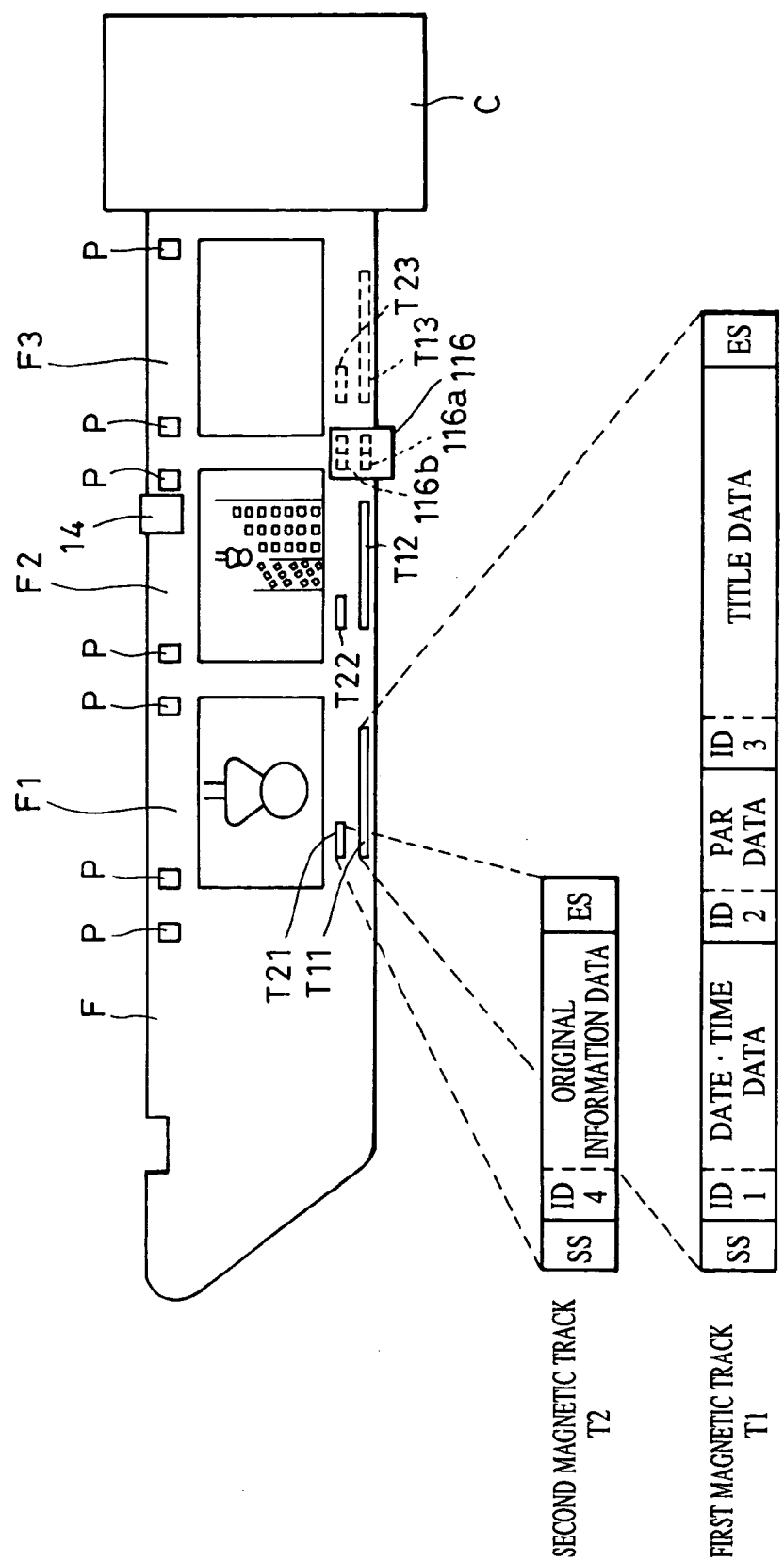
FIG. 11 is a configuration diagram for illustrating a recording operation of the camera according to the first embodiment.

Parts for detecting location information and for recording it as original information into a recording medium along with an image, will be described with reference to FIGS. 8 to 11. FIG. 8 is a block diagram showing a configuration of a camera, FIG. 9 is an external view of the camera, FIG. 10 is a flowchart showing an operation of the camera, and FIG. 11 is a diagram for illustrating a recording operation of the camera.

Figure 9:
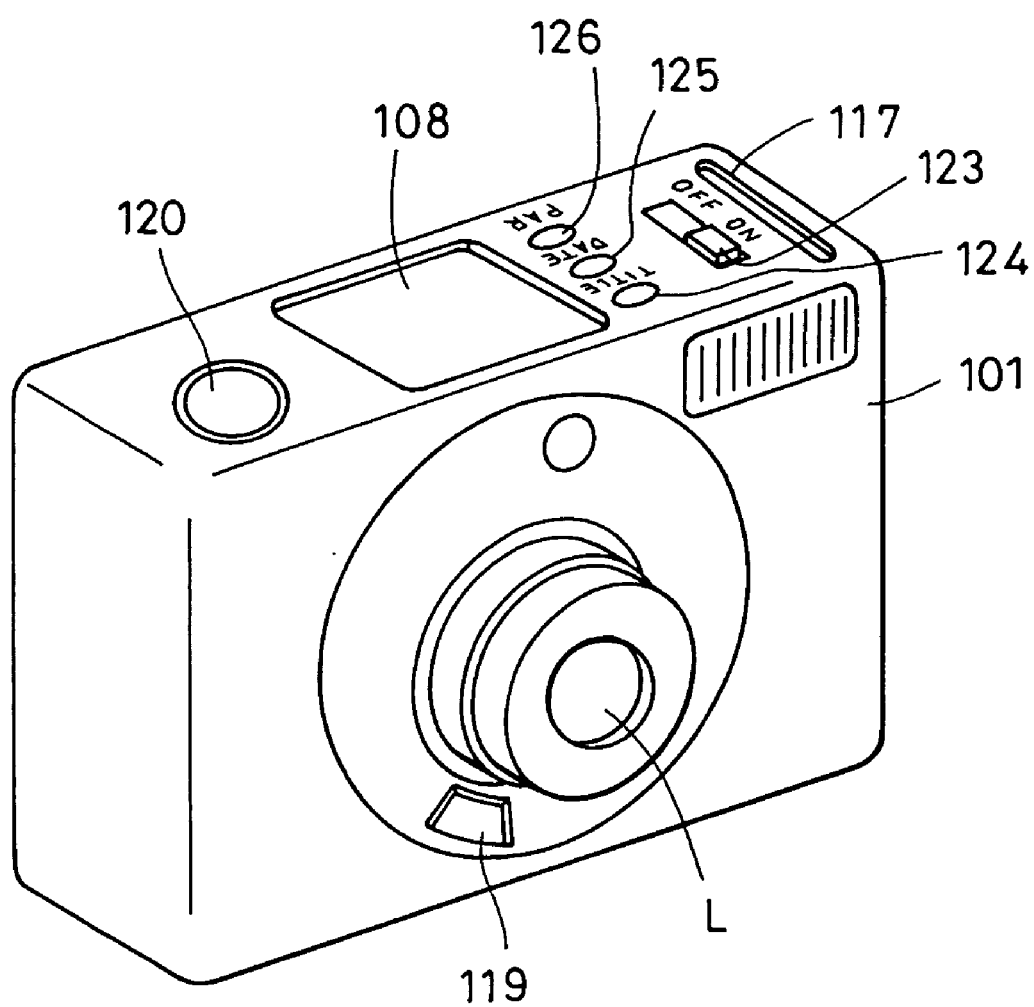
FIG. 9 is an external view of the camera according to the first embodiment.

As shown in FIGS. 8 and 9, the camera 101 includes a microprocessor 102 for controlling an operation of the camera, and in which a ROM and a RAM are installed, a photo-metering circuit 103 (hereinafter, it is referred to as a metering circuit), a distance-measuring circuit 104, a shutter controlling unit 105, an auto-focus controlling unit 106, a display circuit 107 for driving a display device 108, a clock circuit 109 for counting a date and time automatically, a data storing circuit 110 for temporarily storing data to be recorded, a feeding motor driving circuit 111 for driving a photo film F that is accommodated in a cartridge, through a feeding mechanism 112, and a film feeding quantity detecting circuit 113 for detecting a perforation P (see FIG. 11) in the film F by driving a photo-reflector 114, and for detecting a feeding quantity of the film.

The camera 101 also includes a magnetic recording/reproducing circuit 115 for recording magnetic information onto the film F through a magnetic head 116 or for reproducing the magnetic information recorded in the film F, a positioning receiver 117 for receiving a radio wave of a GPS system, and a receiving circuit 118 for driving the positioning receiver and for calculating a current position (the latitude and the longitude) from the radio wave being received.

The camera 101 further includes a main switch 119 of the camera, a shutter button 120, a switch 121 ("switch 1") that closes at a first stroke of the shutter button 120, a switch 122 ("switch 2") that closes at a second stroke of the shutter button 120, a positioning switch 123 for establishing whether a positioning by the positioning receiver 117 and the receiving circuit 118 should be implemented or not, a title switch 124 for selecting a title of an image, which is to be recorded with the image, a DATE switch 125 for establishing whether a date and time should be recorded or not with the image, an aspect ratio switch 126 for selecting an aspect ratio of the image of the picture-taking, and a picture-taking lens L.

Herein, the photo film F preferably is one in which a magnetic recording layer that is optically transparent is provided on a base surface side thereof (a side opposite the emulsion painted surface), and enables magnetic recording and reproducing by the magnetic head from the base surface side of the film.

In the following, operation of the camera will be described, based on the flowchart of FIG. 10. When the main switch 119 of the camera is turned ON, then at step S101 (hereinafter, the word "step" is omitted) it is determined whether a first stroke of the shutter button 120 is performed, i.e., whether the switch 121 ("switch 1") is closed (ON) or not, and processing is held in a loop if it is not ON, but processing proceeds to S102 if it is ON. At S102, it is determined whether the positioning switch 123 is set to ON, then proceeding to S105 (bypassing S103 and S104) if it is OFF, but proceeding to 8103 if it is ON.

At S103 the positioning receiver 117 is driven through the receiving circuit 118. At S104 a receiving radio wave of the positioning receiver 117 is calculated in the receiving circuit 118, and latitude and longitude information that is a result of the calculation thereof is captured, and after having been temporarily stored in the data storing circuit 110. At 8105 it is determined whether "record date and time" is indicated by the DATE switch 125, proceeding to S107 (bypassing S106) if it is not so indicated, but proceeding to S106 capturing the current date and time into the clock circuit 109 and temporarily storing it in the data storing circuit 110 if it is so indicated.

At S107 it is determined whether "title record" is indicated by the title switch 124, proceeding to S109 (bypassing S108) if it is not so indicated, but temporarily storing at S108 the content of the title being selected into the data storing circuit 110 and proceeding to S109 if it is so indicated. At S109 the aspect ratio of the image of picture-taking that is selected by the aspect ratio switch 126 is stored into the data storing circuit 110. At S110 metering of an object of picture-taking is performed by the metering circuit 103. At S111 distance-measurement of the object of picture-taking is performed. At S112 it is determined whether the shutter button 120 is pressed down to the second stroke thereof, i.e., whether the switch 122 ("switch 2") is turned ON with processing returning to S101 and then holding if it is turned OFF, but proceeding to S113 if it is turned ON.

At S113 a picture-taking operation is performed. That is, auto-focus control is performed by driving the picture-taking lens L through the auto-focus controlling unit 106 based on the result of S11, and then the film F is exposed by driving the shutter controlling unit 105 based on the result of S110.

Then, S114 starts the film F feeding to the next picture taking frame by driving the feeding motor driving circuit 111.

At S15 the magnetic head 116 is driven through the magnetic recording/reproducing circuit 115, magnetically recording various kinds of segments of information that have been temporarily stored in the data storing circuit 110 on the magnetic recording layer of the film F.

At S116 it is determined whether film feeding for one frame is completed by the photo-reflector 114 and the film feeding quantity detecting circuit 113, waiting until complete if it is not completed, but proceeding to S117 and stopping the feeding motor via the feeding motor driving circuit 117 if it has been completed. As a result, a camera film feed operation for one frame is finished.

In the following a state of the magnetic record that is recorded on the film F at S115 will be described with reference to FIG. 11.

F1, F2, F3, . . . denote the respective picture-taking frames, where F1 denotes the first frame. In this figure the first frame and the second frame have been exposed, and various kinds of segments of information corresponding to the respective frames have been recorded.

The information corresponding to the respective frames is recorded as being separated in the first magnetic track T1 and the second magnetic track T2. For the first frame F1, it becomes the first magnetic track T11, the second magnetic track T21, and for the second frame F2, it becomes the first magnetic track T12, the second magnetic track T22. Two magnetic tracks are respectively recorded by the first channel 116a and the second channel 116b of the magnetic head 116.

As exemplified in enlarged from for the first frame 1, the order of recordings of the first magnetic track T1 is arranged by an SS (Start Sentinel) information indicating a beginning of the information, ID1 information indicating an ID of the date and time information, an actual date and time data following thereafter, ID2 information indicating an ID of aspect ratio information, the actual aspect ratio data following thereafter, ID3 information indicating an ID of title information, an actual title data following thereafter, and ES (End Sentinel) information indicating an end of the information.

The order of recordings of the second magnetic track T2 is arranged by an SS indicating a beginning of the information, ID4 information indicating location information detected by the positioning means, and latitude and longitude information (original information) that is recorded in a latitude and longitude form, with actual latitude and longitude data (original information data) following thereafter, and ES information indicating an end of the information.

Herein, the original information is location information and the like that are recorded at a time of picture-taking, and represents the location information that is already recorded in a recording medium along with an image, when a recording medium such as a photo film and the like is loaded in a recording apparatus to be described below.

In the following, a recording apparatus according to the preferred embodiment of the present invention will be described with reference to FIGS. 1 to 7.

Figure 1:
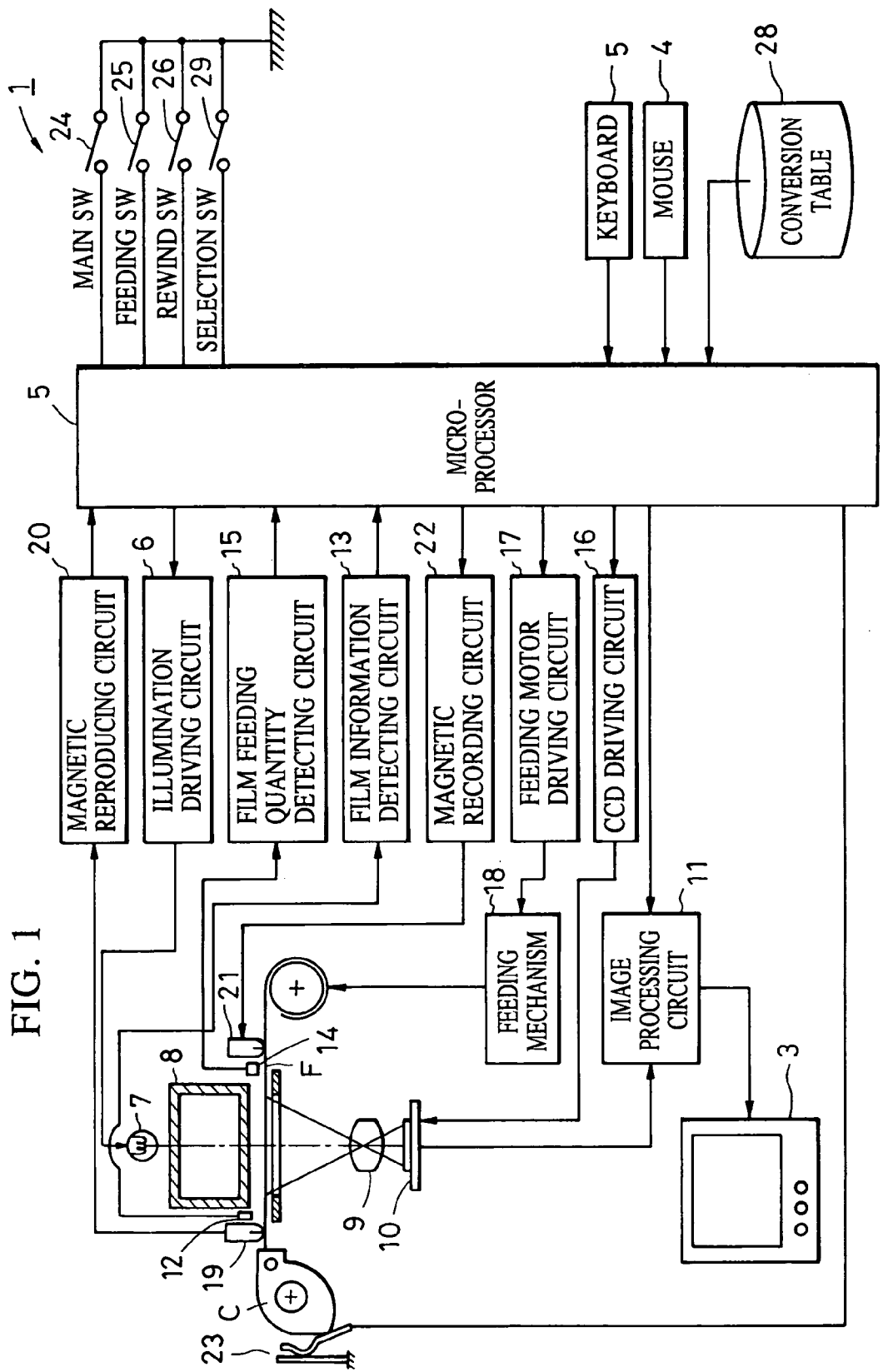
FIG. 1 is a block diagram showing a configuration of a CRT monitor appreciation apparatus according to a first embodiment of the present invention.
Figure 2:
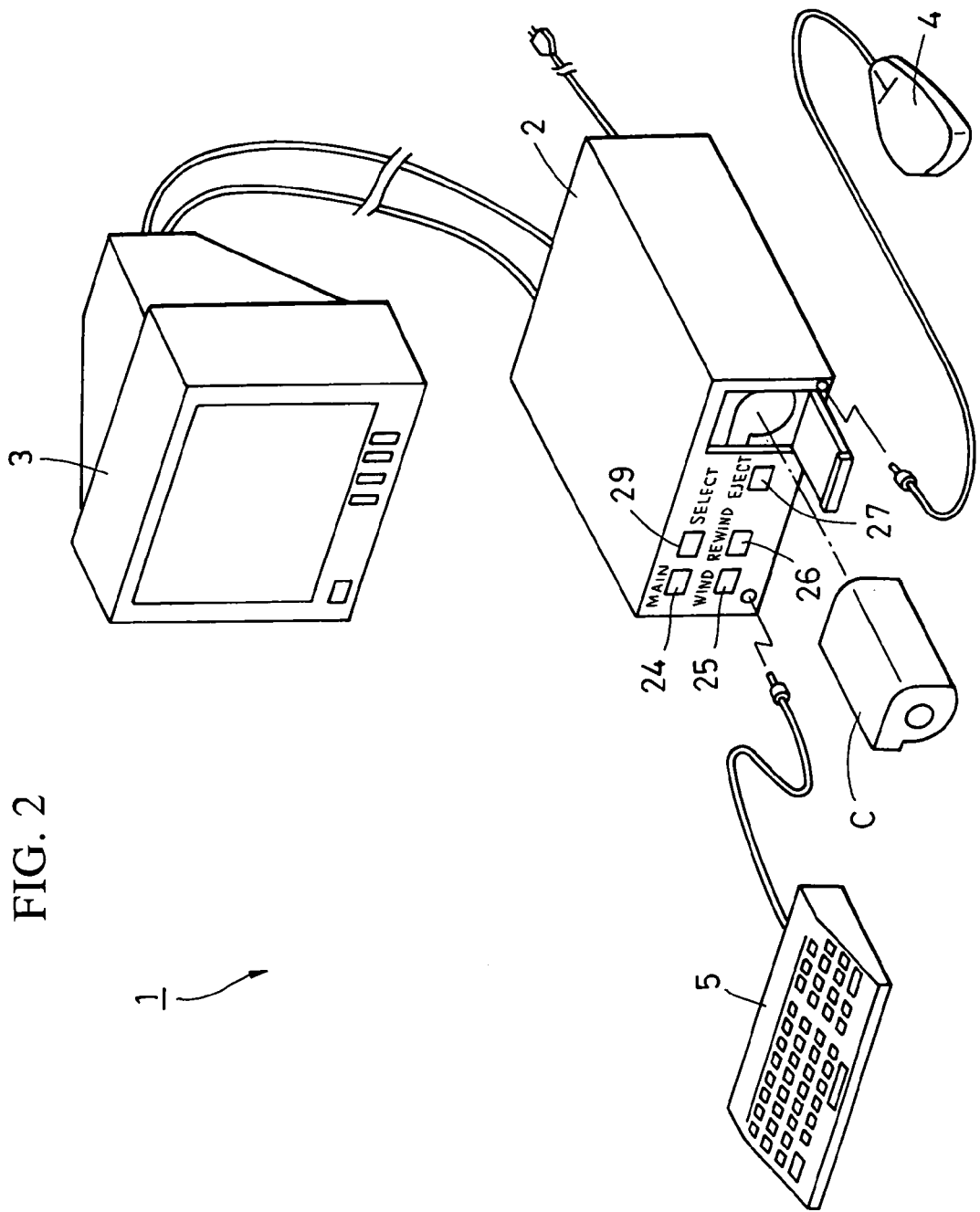
FIG. 2 is an external view of the CRT monitor appreciation apparatus according to the first embodiment.
Figure 4:
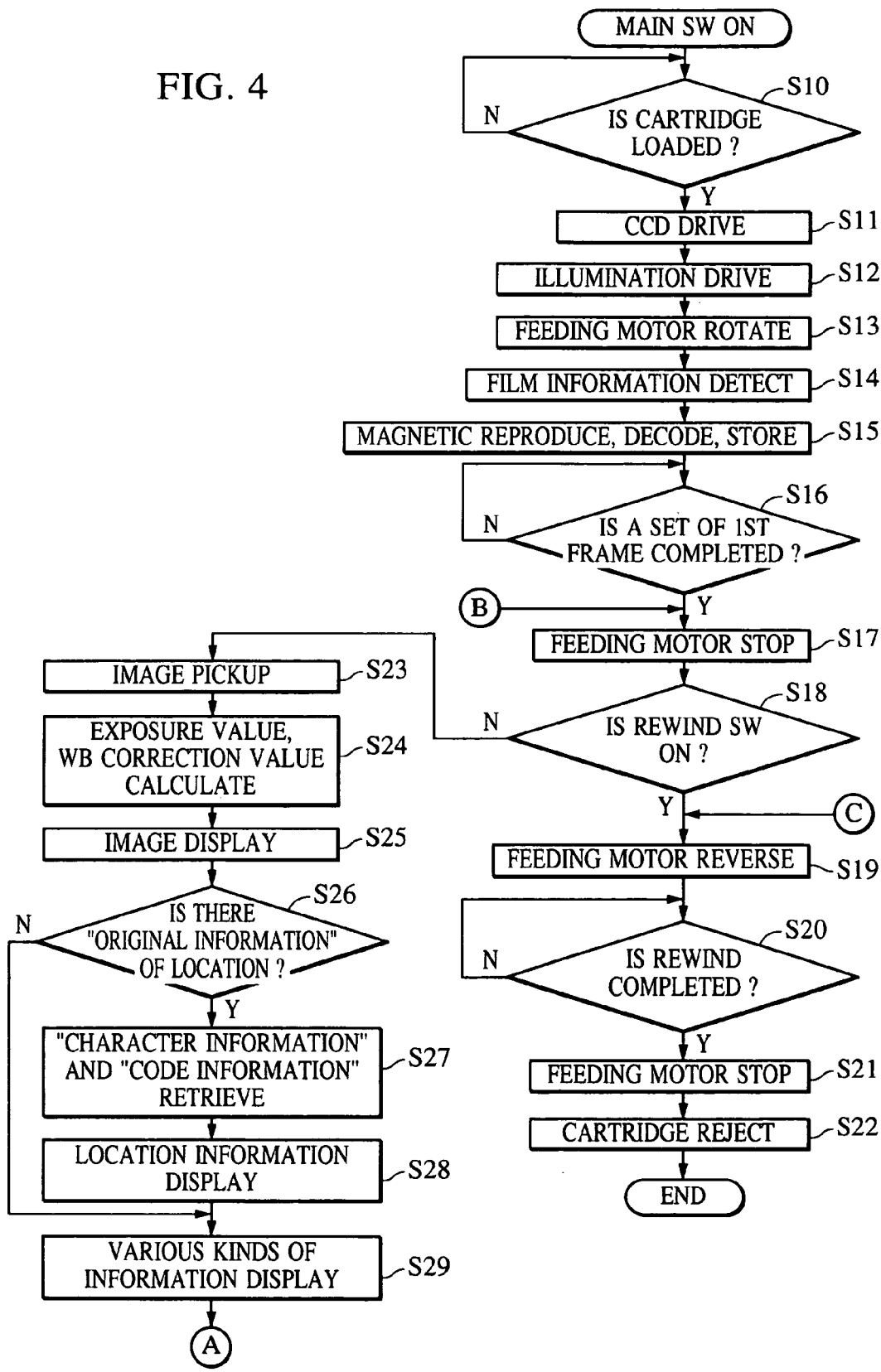
FIG. 4 is a flowchart showing an operation of the first embodiment.
Figure 5:
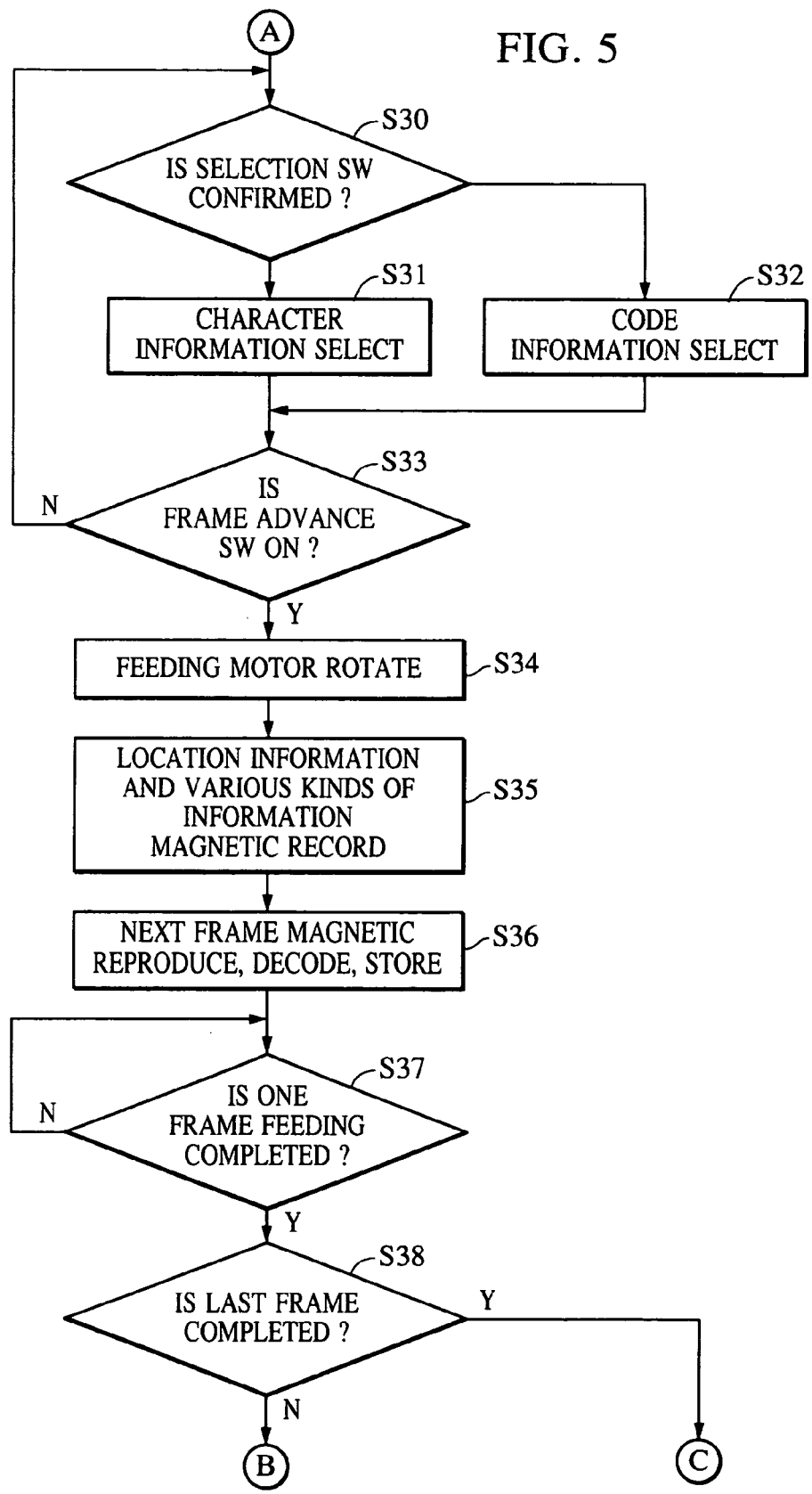
FIG. 5 is a flowchart showing an operation of the first embodiment.
Figure 6:
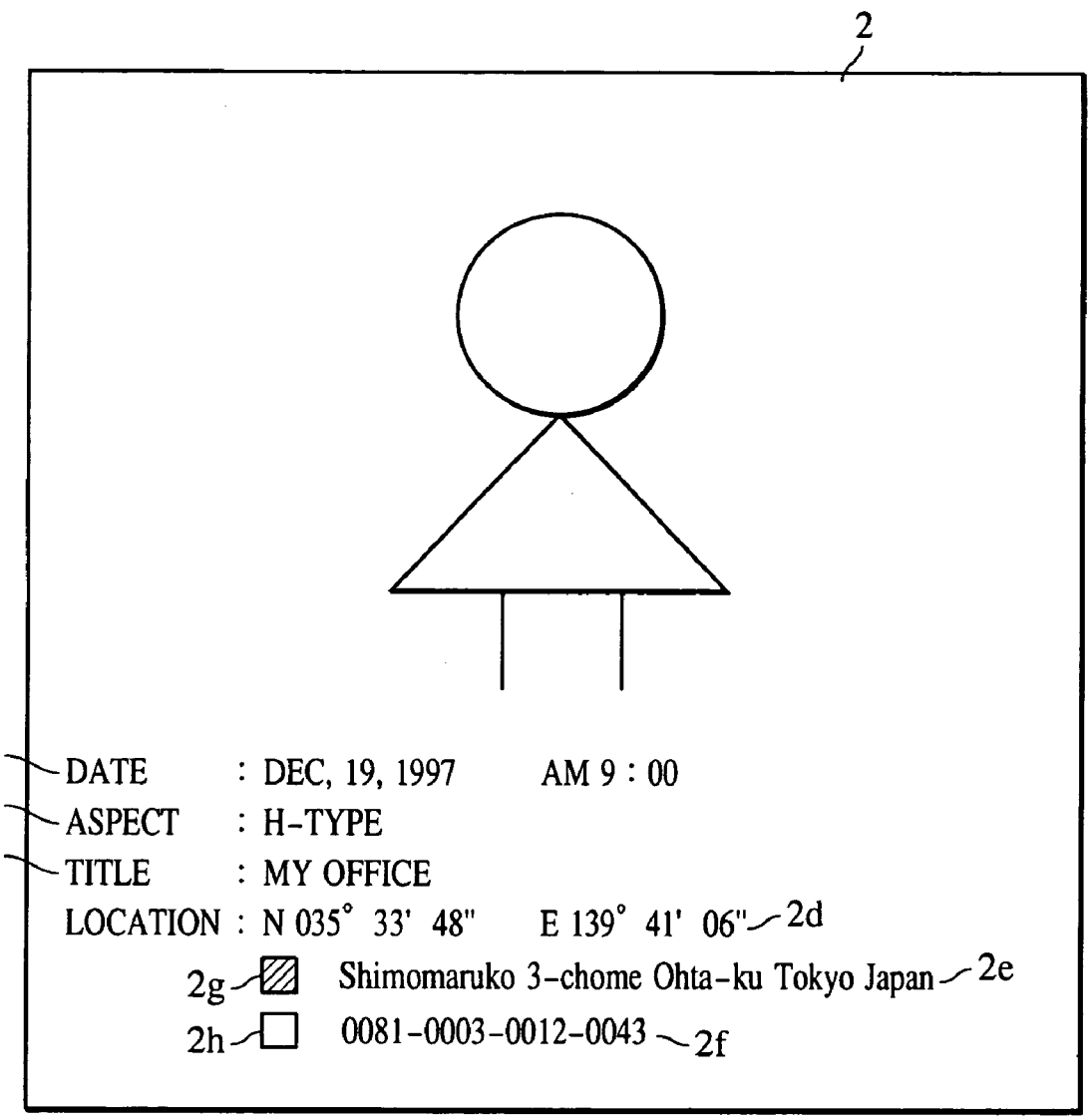
FIG. 6 is a configuration diagram showing a display example of the monitor.
Figure 7:
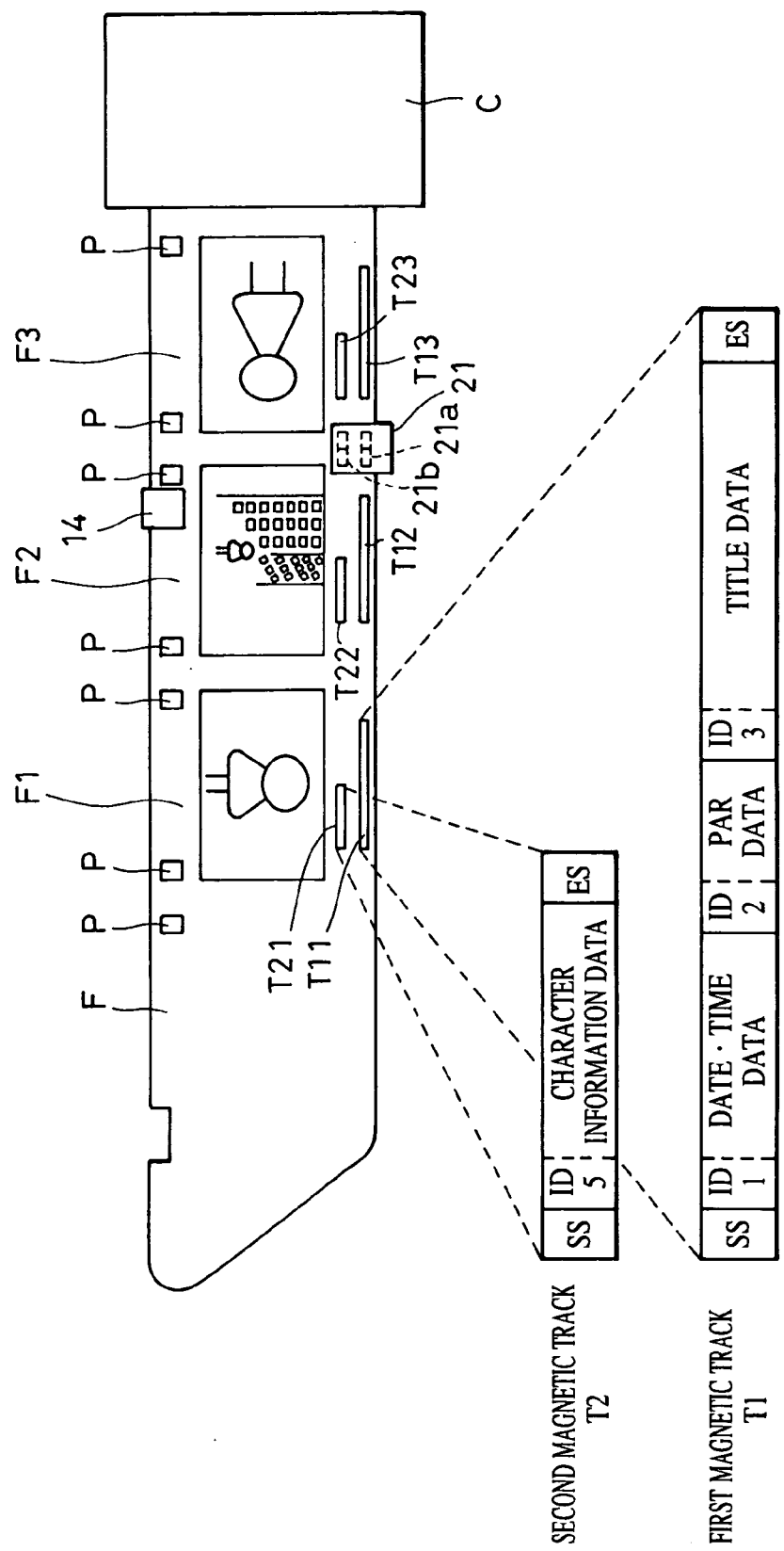
FIG. 7 is a configuration diagram for illustrating a recording operation of the first embodiment.

FIG. 1 is a block diagram showing a configuration of the CRT monitor appreciation apparatus that is the recording apparatus, FIG. 2 is an external view, FIG. 3 is a diagram for illustrating the contents of the conversion table in FIG. 1, FIGS. 4 and 5 are flowcharts for illustrating the operation of the CRT monitor appreciation apparatus, FIG. 6 is a diagram for illustrating a display example on the CRT monitor, and FIG. 7 is a diagram for illustrating a recording operation of the appreciation apparatus.

As shown in FIGS. 1 and 2, a CRT monitor appreciation apparatus 1 includes a main body 2, a CRT monitor 3, a mouse 4 for implementing various kinds of inputs, a keyboard 5, and a film cartridge C in which photo film F having a magnetic recording layer is installed. The photo film F is already exposed and developed, thereby containing an image that is clearly imaged. Further, the information that is magnetically recorded on the film at a time of the exposure/picture-taking remains in the state as it is.

The CRT monitor appreciation apparatus includes a microprocessor MP for controlling operation of the appreciation apparatus, the microprocessor being provided within the main body 2, and having a ROM and a RAM installed therein. The CRT apparatus also includes an illumination driving circuit 6 for illuminating an image on the film F by driving an illumination light source 7, an illumination box 8 for obtaining a uniform illumination, an optical system 9 for image-forming an image from the film F onto a CCD 10, a CCD driving circuit 16, and an image processing circuit 11 for implementing a white balance adjustment, an exposure compensation based on the exposure data input from the key board 5 and the mouse 4, a color compensation, a superimposition of various kinds of segments of information and the like, and for causing the CRT monitor 3 to display the last image.

The CRT monitor apprecation apparatus 1 also includes a photo-reflector 12, which detects barcode information that is clearly imaged on the film F, a film information detecting circuit 13, which reads a maker name, a classification and the like of the film according to the barcode information detected by the photo-reflector 12, and inputs them to the microprocessor MP, another photo-reflector 14, which detects the perforation P on the film F, and a film feeding quantity detecting circuit 15, which detects a feeding quantity of the film according to the perforation signal detected by the photo-reflector 14, and inputs it to the microprocessor MP.

The CRT monitor appreciation apparatus 1 further includes a feeding motor driving circuit 17, which performs a feeding of the film F through a feeding motor (not shown), and a feeding mechanism 18, a reproducing head 19, a magnetic reproducing circuit 20, which performs a reproduction of the information that is magnetically recorded on the film F, a recording head 21, and a magnetic recording circuit 22, which performs an additional recording of new information to the film F and a re-recording of the information in which a content thereof is modified.

The CRT monitor appreciation apparatus 1 still further includes a cartridge detecting switch 23, which detects whether a film cartridge C is loaded in the main body 2 or not, and inputs it to the microprocessor MP, a main switch 24, a feeding switch 25 that indicates one frame feeding of a film, a rewind switch 26 that indicates a rewind of a film, an ejector switch 27, which is mechanically switched at a time when the film is ejected, and a conversion table 28, which is a storage device in which a corresponding table of the information in the various kinds of forms for the locations is recorded.

Herein, a content of the conversion table 28 will be described, based on the example in FIG. 3.

The conversion table 28 relates the latitude and longitude information recorded in the latitude and longitude recording form applicable to the original information, the place name, location name as the character information recorded in the corresponding character recording form, and the barcode number as the code information recorded in the code recording form, one-by-one.

It is preferable that the above-mentioned three kinds of recording forms of the information are determined with the most suitable forms to the respective information. In FIG. 3, it is set that the original information (the latitude and longitude information) is in a form of the latitude and the longitude being recorded identifiably, the character information is in a form of being recorded with the character string using the character set defined by the ISO646 and the like, and the code information is in a form being recorded with the numerical string.

Returning to FIG. 1, a numeral 29 denotes a selection switch, that is a switch for selecting either a first recording form (the place name, location name that are the character information) that is obtained through the conversion table 28 from the original information for the location (the latitude and longitude information) or a second recording form (the code numbers that are the code information).

In the following, an operation of the CRT monitor appreciation apparatus will be described, based on the flowcharts in FIGS. 4 and 5.

When the main switch 24 is turned ON, at step S10 it is determined whether the cartridge C is loaded or not according to a state of the cartridge detecting switch 23, holding if it is not loaded, but proceeding to S11 if it is loaded. At S11 the CCD 10 is driven by the CCD driving circuit 16. At S12, the light source 7 is driven by the illumination driving circuit 6. At S13, the feeding motor is rotated by the feeding motor driving circuit 17, starting a feeding of the film F.

At S14, the information of the film maker name, the film classification, the number of picture-taking frames and the like are read from the barcode information on the film F by the photo-reflector 19 and the film information detecting circuit 13. At S15, reproduction, decoding and storing operations of the information that is magnetically recorded on the film F are performed by the reproducing head 19 and the magnetic reproducing circuit 20. At S16, it is determined whether the beginning of the first picture-taking frame of the film F is completed or not, by the photo-reflector 14 and the film feeding quantity detecting circuit 15, waiting for the completion if it is not completed, but proceeding to S17 if it is already completed.

At S17, driving of the feeding motor is stopped. At S18, it is determined whether the rewind switch 26 is turned ON or not, and if it is turned ON, then the feeding motor is reversed at S19; after having waited for completion of a rewind of the film at S20, the feeding motor is stopped at S21, the cartridge C is ejected at S22, and the process ends then. On the other hand, if the rewind switch 26 is not turned ON at S18, the process proceeds to S23, and picture-taking of an image is performed by the CCD 10 and the CCD driving circuit 16. At S24, white balance adjustment of the image by the image processing circuit 11, exposure compensation based on exposure compensation data input from the keyboard 4 and the mouse 3, and color compensation and the like are performed, and then at S25 a display of the image is performed by the CRT2.

Then, proceeding to S26, it is determined whether the original information (the latitude and longitude information) that is the local information is to be included or not among the magnetic information read by the magnetic reproducing circuit 20, and proceeding to S29 (bypassing S27 and S28) if it is not included, but proceeding to S27 if it is included. At S27 the character information (place name, location name) and the code information (code number) corresponding to the original information that is recorded, is determined by retrieving the conversion table 28. At S28, the determined character information and the code information are superimposed with the original information on the CRT 2 through the image processing circuit 11. Then, at S29, information other than the location information is superimposed thereon.

FIG. 6 shows a display example of the CRT monitor 2 at that time, where the date and time information 2a, the aspect ratio information 2b, the title information 2c, the latitude and longitude information 2d that is the original information of the location information, and the character information 2e that is selected as the retrieval result and the code information 2f and displayed. Next, at S30 it is determined whether the character information or the code information is selected by the selection switch 29, and at S31 and S32 the selected information is stored. In the CRT monitor, it makes possible to confirm which information is selected with the selection marks 2g, 2h in FIG. 6.

At S33, it is determined whether the feeding switch 26 is turned ON or not, returning to S30 if it is not turned ON, but proceeding to S34 if it is turned ON. At S34, film feeding is started by rotation-driving the feeding motor. At S35, the location information that is stored at S31 or at S32 is magnetically recorded on a film by the recording head 21 and magnetic recording circuit 22. At S36, similar to S15, reproducing, decoding, and storing operations for the magnetic information that is recorded on the next picture-taking frame are performed. At S37, it is determined whether film feeding for one frame is completed or not, waiting for completion if it is not completed, but proceeding to S38 if it is completed.

At S38, it is determined whether a last frame of a film is completed or not, returning to S17 if it is not completed, and performing operations that are similar to the ones described as above. If it is determined that the operation of the last frame is completed at S38, a rewind operation of the film is performed at S19.

Now, this will describe a state of a magnetic recording that is recorded on the film F at S35, with reference to FIG. 7, which it shows a case in which the character information that is recorded in the character form is selected as the location information at S30. Further, for the same elements in FIG. 11, the same symbols are attached thereto and the descriptions thereof are omitted.

Since the recorded content of the first magnetic track T1 is not changed, it becomes the same as the one at a time of picture-taking (FIG. 11). The recorded content of the second magnetic track is such that the location information is changed and re-recorded from the original information to the character information, and the order of this recording becomes a SS (Start Sentinel), ID5 information indicating the character information that is recorded in character form, followed by the character information data, and an ES (End Sentinel) indicating an end of the information.

When the code information is selected as the location information at step S30, instead of the ID5 information, ID6 information indicating the code information which is recorded in code form that is to be the location information, and instead of the character information data, the code number data are respectively recorded.

In the present embodiment, it is possible to obtain the character information or the code information, to which the original information as the location information is converted, and to re-record this on the film in place of the original information. Further, desirable information can be recorded selectively from the character information and the code information.

In the following, the second embodiment will be described.

A configuration of the CRT monitor appreciation apparatus in the present embodiment is the same as in FIG. 1, and it is assumed to adopt this, but it differs from the first embodiment in such a point that for the location information, the original information can be selected in addition to the character information and the code information by the selection switch 26.

Figure 12:
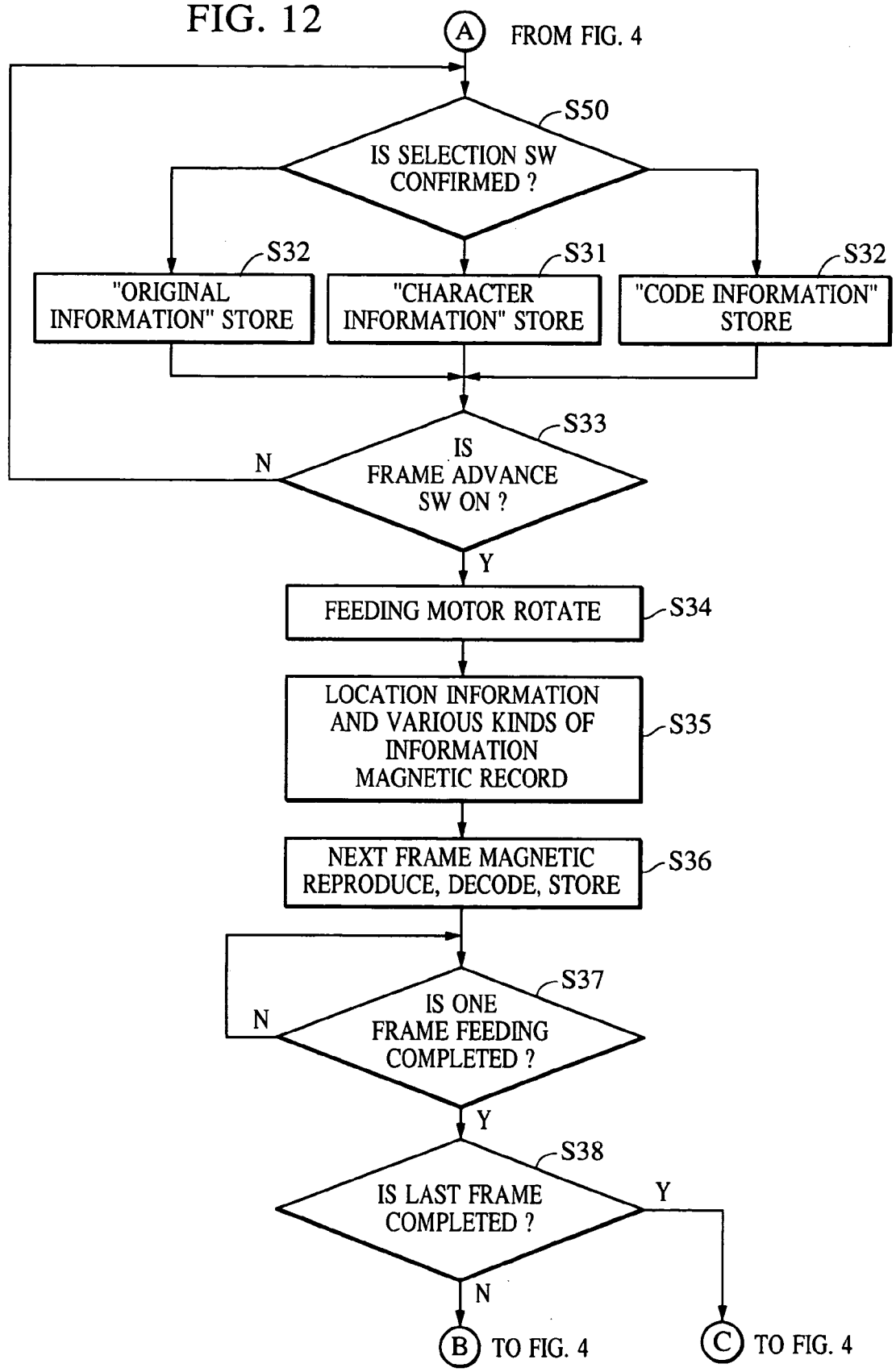
FIG. 12 is a flowchart showing an operation of a CRT monitor appreciation apparatus according to a second embodiment.

FIG. 12 is a flowchart for illustrating an operation of the present embodiment, and is comparable to FIG. 5 of the first embodiment. In embodiment FIG. 12, the same step numbers are attached to steps that are the same as in FIG. 5.

S30 in FIG. 5 is equivalent to S50 in FIG. 12. At S50, it is determined whether the original information (the latitude and longitude information being recorded in the latitude and longitude form), the character information, or the code information is selected by the selection switch 26, proceeding to S51 and storing the original information if the original information is selected, but proceeding to S31 and storing the character information if the character information is selected, or proceeding to S32 and storing the code information if the code information is selected. Thereafter, similar operations as the ones in the first embodiment are performed.

In the present embodiment, it is possible to retain the original information on the film as it is, other than only the converted information such as the character information and the code information.

In the following, the CRT monitor appreciation apparatus according to the third embodiment will be described with reference to FIGS. 13 to 15.

Figure 13:
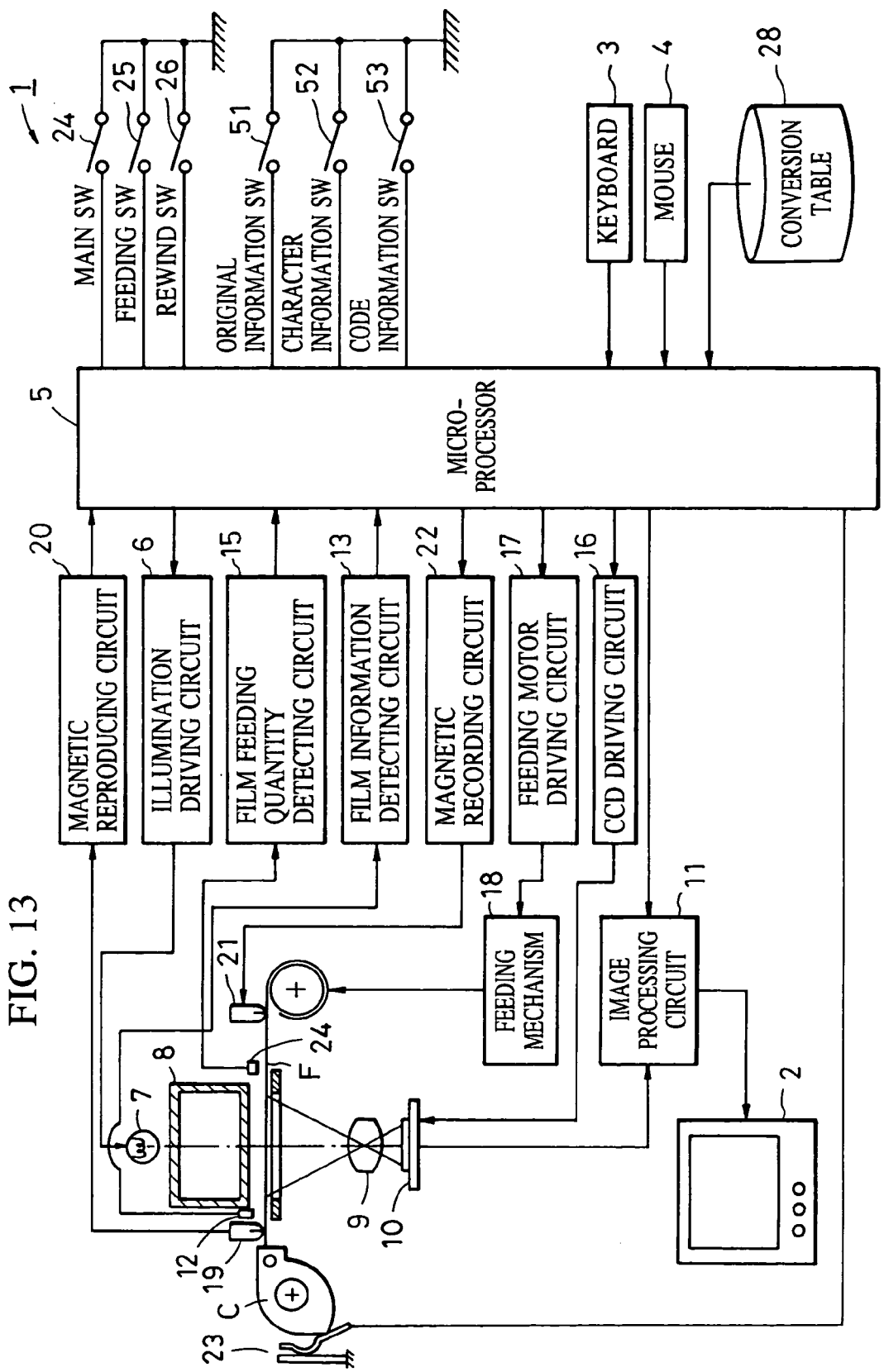
FIG. 13 is a block diagram showing a configuration of a CRT monitor appreciation apparatus according to a third embodiment.

FIG. 13 is a configuration diagram, and the same numbers are attached to the elements that are the same as the ones in FIG. 1. It differs from FIG. 1 in the point such that the selection switch 29 is not provided, but instead there are provided three switches: an original information switch 51 for indicating a record of the original information (the latitude and longitude information in the present embodiment), a character information switch 52 for indicating a record of the character information, and a code information switch 53 for indicating a record of the code information. It is arranged such that the three switches can be set ON/OFF individually, that is, it is possible to select indication/no-indication of a record for each information.

FIG. 14 is a flowchart for illustrating the operations, and the same step numbers are attached to the operations that are the same as the ones in FIG. 5.

Proceeding from S29 in FIG. 4 according to the first embodiment, at S60, it is determined whether the original information switch 51 is turned ON or not, proceeding to S61 (bypassing S62) if it is not turned ON, but proceeding to S61 if it is turned ON. At S61, the corresponding original information (the latitude and longitude information) is stored, proceeding to S62. At S62, it is determined whether the character information switch 52 is turned ON or not, proceeding to S64 if it is not turned ON, but proceeding to S63 if it is turned ON.

At S63, the corresponding character information (the place name, the location name) is stored. At S64, it is determined whether the code information switch is turned ON or not, proceeding to S66 if it is not turned ON, but proceeding to S65 if it is turned ON. At S65, the corresponding code information (the code number) is stored. At S66, it is determined whether the feeding switch 25 is turned ON or not, returning to S60 if it is not turned ON, but proceeding to S34 if it is turned ON. It will be the same operations as in FIG. 5 after S34, and at S35, the location information being stored at S60 to S65 are magnetically recorded on the film.

FIG. 15 is a diagram illustrating a state of the magnetic record that is recorded on the film F in the present embodiment, and the same numbers are attached to the elements that are the same as the ones in FIG. 7.

Herein, at steps S60 to S65, all three kinds of data of location information are indicated, and at the step S35, the state of being magnetically recorded is indicated. Since the recorded content of the first magnetic track T1 is not changed, it is the same as the one at a time of picture-taking (FIG. 11).

All three kinds of data of location information are recorded on the second magnetic track T2, and it is arranged as a SS (Start Sentinel) indicating a beginning of the information, ID4 information indicating the original information, i.e., the latitude and longitude information that is recorded in the latitude and longitude form, followed by the original information data, ID5 information indicating the character information that is recorded in the character form, followed by the character information data, ID6 information indicating the code information that is recorded in the code form, the code information data, and an ES (End Sentinel) indicating an end of the information.

In the present embodiment, besides the above-mentioned recording of all three kinds of segments of information including the original information, an individual recording of the respective information and/or a recording combining any two kinds of the segments of information are available.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in the embodiments described above, the images associated with the location information are the picture-taking images, but the present invention is applicable to images other than picture-taking images.

Further, in the third embodiment, when the latitude and longitude information that is the original information is selected, it is arranged to re-record this information, but it may be arranged to use the recorded original information as it is, so as to not re-record.

Moreover, in the first to third embodiments, a photo film having a magnetic recording layer as the recording medium for recording the image and the location information is illustrated, but it is not limited thereto. A memory card, a floppy disk and the like are suitable other recording media. In these cases, it is easy to modify the CRT appreciation apparatus and the camera to the structures suitable for these recording media.

Further, the CRT monitor appreciation apparatus is exemplified as a recording apparatus, but it is not limited thereto, and as suitable examples for the recording apparatus, there are an apparatus for producing a print from a photo film (in this case, the location information is recorded on a paper and the like on which a print is produced, and a recording form thereof may be selectable), an image reproducing apparatus for a computer processing, and the like.

Moreover, as the original information of the location information, the latitude and longitude information based on the GPS system, which is detected by the camera, is exemplified, but it is not limited thereto; the information may be information showing location information that is recorded on the recording medium in advance at a time when the recording medium is loaded on the recording apparatus, and for example, it may be positional information obtained from a radio wave of a communication base station, location information of which the content thereof is transferred from other recording medium and then is recorded, and the like.

In the following, a recording medium according to the present invention will be described.

The systems according to the respective embodiments shown in FIGS. 1, 2, 8, 9 and 13 and the like may be constructed in hardware, or they may be constructed in computer systems constituting CPUs, a memory and the like. When constructed in a computer system, the above-mentioned memory constitutes the recording medium according to the present invention. In this recording medium, there is stored a program for performing the processes included in the flowcharts and the like of FIGS. 4, 5, 10, 12, 14 described above, and it constitutes a computer program product for providing the program.

Moreover, as this recording medium, a semiconductor memory such as a ROM, a RAM and the like, an optical disk, a magneto-optical disk, and a magnetic recording medium and the like may be used, and they may be constituted as a CD-ROM, an FD, a magnetic card, a magnetic tape, a non-volatile memory card and the like.

Accordingly, by using this recording medium in another system or apparatus other than the systems according to the above-mentioned respective embodiments, and as the system or the computer reads and performs the program codes stored in the recording medium, it implements the functions and effects that are equivalent to the ones in the respective embodiments described as above, thereby achieving the objects of the present invention.

Further, when the OS and the like running on the computer perform a portion of or all of the processes, or after the program codes read from the recording medium are written into a memory that is provided in an extension board inserted into the computer or in an extension unit connected to the computer, and when the CPU and the like provided in the above-mentioned extension board or extension unit perform a portion of or all of the processes based on the instructions of the program codes, it implements the functions and effects that are equivalent to the ones in the respective embodiments described as above, thereby achieving the objects of the present invention.

Moreover, the present invention is such that the technical elements of the embodiments as described above may be combined as required.

Further, the present invention is such that a portion of or all of the constituents of the claims or of the embodiments may form one apparatus, or may be combined with another apparatus, or may be an element constituting an apparatus.

What is claimed is:

1. An apparatus, comprising:
    a connection device that receives a camera-detachable image recording medium into which a picture-taking image and location information associated with the picture-taking image previously have been recorded by an external camera;
    an input device that inputs, as original location information, the location information from the camera-detachable image recording medium;
    a conversion device that converts the original location information input by said input device to second location information in a predetermined representation form;
    a storing device that stores in the apparatus the original location information input by said input device and the second location information converted by said conversion device; and
    a recording device that records the second location information converted by said conversion device into the camera-detachable image recording medium in association with the corresponding picture-taking image.

2. An apparatus according to claim 1, further comprising a selection device that selects whether or not the second location information converted by said conversion device is recorded into the image recording medium together with the original location information.

3. An apparatus according to claim 1, wherein said input device inputs original location information that is magnetically recorded on a film.

4. An apparatus according to claim 1, further comprising a selection device that selects a representation form in which said recording device records into the image recording medium.

5. An apparatus according to claim 1, wherein said input device inputs latitude and longitude information as the original location information.

6. An apparatus according to claim 1, wherein said conversion device converts the original location information to second location information in at least one representation form selected from the group consisting of a character form, a code form, and a latitude and longitude form.

7. An apparatus, comprising:
a connection device that receives a detachable image recording medium into which an image and location information associated with the image previously have been recorded by an external device;
an input device that inputs, as original location information, the location information from the detachable image recording medium;
a conversion device that converts the original location information input by said input device to second location information in a predetermined representation form;
a storing device that stores in the apparatus the original location information input by said input device and the second location information converted by said conversion device; and
a recording device that records the second location information converted by said conversion device into the detachable image recording medium in association with the corresponding image.

8. An apparatus according to claim 7, wherein said recording device records both the second location information and the original location information.

9. An apparatus according to claim 7, further comprising a selecting device that selects whether or not the second location information is recorded into the detachable image recording medium together with the original location information.

10. An apparatus according to claim 7, wherein said converting device converts the original location information to second location information in at least one representation form selected from the group consisting of a character form, a code form or a latitude and longitude form.

11. An apparatus according to claim 7, wherein said input device inputs location information in latitude and longitude form as original location information.

12. A method of converting location information, comprising the steps of:
connecting to an apparatus a camera-detachable image recording medium into which a picture-taking image and location information associated with the picture-taking image previously have been recorded by an external camera;
inputting the location information from the camera-detachable image recording medium to the apparatus, as original location information;
converting the original location information input in said inputting step to second location information in a predetermined representation form;
storing in the apparatus the original location information input in said inputting step and the second location information converted in said converting step; and
recording the second location information converted in said converting step into the camera-detachable image recording medium in association with the corresponding picture-taking image.

13. A method according to claim 12, wherein said recording step includes recording both the second location information and the original location information.

14. A method according to claim 12, further comprising the step of selecting whether or not the second location information is recorded into the camera-detachable image recording medium together with the original location information.

15. A method according to claim 12, wherein said converting step includes converting the original location information to second location information in at least one representation form selected from the group consisting of a character form, a code form or a latitude and longitude form.

16. A method according to claim 12, wherein said inputting step includes inputting location information in latitude and longitude form as original location information.

17. A method of converting location information, comprising the steps of:
connecting to an apparatus a detachable image recording medium into which an image and location information associated with the image previously have been recorded by an external device;
inputting the location information from the detachable image recording medium to the apparatus, as original location information;
converting the original location information input in said inputting step to second location information in a predetermined representation form;
storing in the apparatus the original location information input in said inputting step and the second location information converted in said converting step; and
recording the second location information converted in said converting step into the detachable image recording medium in association with the corresponding image.

18. A method according to claim 17, wherein said recording step includes recording both the second location information and the original location information.

19. A method according to claim 17, further comprising the step of selecting whether or not the second location information is recorded into the detachable image recording medium together with the original location information.

20. A method according to claim 17, wherein said converting step includes converting the original location information to second location information in at least one representation form selected from the group consisting of a character form, a code form or a latitude and longitude form.

21. A method according to claim 17, wherein said inputting step includes inputting location information in latitude and longitude form as original location information.

22. An apparatus, comprising:
a connection device that receives a camera-detachable image recording medium into which a picture-taking image and location information associated with the picture-taking image previously have been recorded by an external camera;
an input device that inputs, as original location information, the location information from the camera-detachable image recording medium;
a conversion device that converts original location information input by said input device to second and third location information in different representation forms;
a storing device that stores in the apparatus the original location information input by said input device and the second and third location information converted by said conversion device; and
a recording device that records the second and third location information, converted by said conversion device, into the camera-detachable image recording medium in association with the corresponding picture-taking image.

23. An apparatus according to claim 22, wherein said recording device records the second and third location information together with the original location information.

24. An apparatus according to claim 22, further comprising a selecting device that selects whether or not the original location information is recorded.

25. An apparatus according to claim 22, wherein said conversion device converts the original location information to second and third location information in at least one representation form selected from the group consisting of a character form, a code form or a latitude and longitude form.

26. An apparatus according to claim 22, wherein said input device inputs location information in latitude and longitude form as original location information.

27. An apparatus, comprising:
a connection device that receives a camera-detachable image recording medium into which a picture-taking image and location information associated with the picture-taking image previously have been recorded by an external camera;
an input device that inputs, as original location information, the location information from the camera-detachable image recording medium;
a conversion device that converts the original location information input by said input device to second and third location information in different representation forms;
a storing device that stores in the apparatus the original location information input by said input device and the second and third location information converted by said conversion device;
a selection device for selecting one or a plurality of the second and third location information converted by said conversion device; and
a recording device that records the selected one or plurality of second and third location information selected by said selection device into the camera-detachable image recording medium in association with the corresponding picture-taking image.

28. An apparatus according to claim 27, wherein said recording device records both the selected one or plurality of second and third location information and the original location information.

29. An apparatus according to claim 27, further comprising a second selecting device that selects whether or not to record the original location information.

30. An apparatus according to claim 27, wherein said converting device converts the original location information to second and third location information in at least one representation form selected from the group consisting of a character form, a code form or a latitude and longitude form.

31. An apparatus according to claim 27, wherein said input device inputs location information in latitude and longitude form as original location information.

32. An image processing method, comprising:
connecting to an apparatus a camera-detachable image recording medium into which a picture-taking image and location information associated with the picture-taking image previously have been recorded by an external camera;
inputting the location information from the camera-detachable image recording medium to the apparatus, as original location information;
converting the original location information input in said inputting step to second location information in a predetermined representation form;
storing in the apparatus the original location information input in said inputting step and the second location information converted in said converting step; and
recording the second location information converted in said converting step into the camera-detachable image recording medium in association with the corresponding picture-taking image.

33. An image processing method, comprising:
connecting to an apparatus a detachable image recording medium into which an image and location information associated with the image previously have been recorded by an external device;
inputting the location information from the detachable image recording medium to the apparatus, as original location information;
converting the original location information input in said inputting step to second location information in a predetermined representation form;
storing in the apparatus the original location information input in said inputting step and the second location information converted in said converting step; and
recording the second location information converted in said converting step into the detachable image recording medium in association with the corresponding image.

34. An image processing method, comprising:
connecting to an apparatus a camera-detachable image recording medium into which a picture-taking image and location information associated with the picture-taking image previously have been recorded by an external camera;
inputting the location information from the camera-detachable image recording medium to the apparatus, as original location information;
converting the original location information input in said inputting step to second and third location information in different representation forms;
storing in the apparatus the original location information input in said inputting step and the second and third location information converted in said converting step; and
recording the second and third location information, converted in said converting step, into the camera-detachable image recording medium in association with the corresponding picture-taking image.

35. An image processing method, comprising:
connecting to an apparatus a camera-detachable image recording medium into which a picture-taking image and location information associated with the picture-taking image previously have been recorded by an external camera;

inputting the location information from the camera-detachable image recording medium to the apparatus, as original location information;

converting the original location information input in said inputting step to second and third location information in different representation forms;

storing in the apparatus the original location information input in said inputting step and the second and third location information converted in said converting step;

selecting one or a plurality of the second and third location information converted in said converting step; and recording the selected one or plurality of second and third location information selected in said selecting step into the camera-detachable image recording medium in association with the corresponding picture-taking image.

36. A location information recording, converting and re-recording system, comprising:

an image recording medium;

a camera, to which said image recording medium is detachably connectable, and which records a picture-taking image and location information associated with the picture-taking image into said image recording medium detachably connected to said camera;

an apparatus comprising:

a connection device that detachably receives said image recording medium into which a picture-taking image and location information associated with the picture-taking image previously have been recorded by said camera;

an input device that inputs, as original location information, the location information from said image recording medium;

a conversion device that converts the original location information input by said input device to second location information in a predetermined representation form;

a storing device that stores in the apparatus the original location information input by said input device and the second location information converted by said conversion device; and a recording device that records the second location information converted by said conversion device into said image recording medium in association with the corresponding picture-taking image.

* * * * *

UNITED STATES PATENT AND TRADEMARK OFFICE
CERTIFICATE OF CORRECTION

| | |
|---|---|
| PATENT NO. | : 6,961,096 B1 |
| DATED | : November 1, 2005 |
| INVENTOR(S) | : Shinichi Tsujimoto |

It is certified that error appears in the above-identified patent and that said Letters Patent is hereby corrected as shown below:

Title page,
Item [30], Foreign Application Priority Data,
"10/370531" should read -- 10-370531 --.

Column 3,
Line 11, "an another" should read -- another --.

Column 5,
Line 27, "8105" should read -- S105 --.
Line 52, "S11," should read -- S111, --.
Line 57, "S15" should read -- S115 --.

Coumn 6,
Line 20, "from" should read -- form --.

Column 7,
Line 10, "the key" should read -- the key- --.

Column 8,
Line 67, "and displayed." should read -- are displayed. --.

Column 9,
Line 27, "which it" should read -- which --.

Column 14,
Line 1, "camera-de-" should read -- camera- --.
Line 2, "tachable" should read -- detachable --.

UNITED STATES PATENT AND TRADEMARK OFFICE
CERTIFICATE OF CORRECTION

PATENT NO. : 6,961,096 B1
DATED : November 1, 2005
INVENTOR(S) : Shinichi Tsujimoto It is certified that error appears in the above-identified patent and that said Letters Patent is hereby corrected as shown below:

Column 16,
Lines 13, 50 and 61, "camera-de-" should read -- camera- --.
Lines 14, 51 and 62, "tachable" should read -- detachable --.

Signed and Sealed this

Thirtieth Day of May, 2006

JON W. DUDAS
*Director of the United States Patent and Trademark Office*